United States Patent [19]

Hodge

[11] Patent Number: 4,960,193
[45] Date of Patent: Oct. 2, 1990

[54] CONCENTRIC SLAVE CYLINDER

[75] Inventor: Bobby L. Hodge, Matthews, N.C.

[73] Assignee: Ina Bearing Company, Inc., Fort Mill, S.C.

[21] Appl. No.: 302,667

[22] Filed: Jan. 27, 1989

[51] Int. Cl.⁵ .................... F16D 23/14; F16D 25/08
[52] U.S. Cl. .................................. 192/91 A; 192/98
[58] Field of Search .................. 192/91 A, 85 CA, 98

[56] References Cited

U.S. PATENT DOCUMENTS

| | | | |
|---|---|---|---|
| 4,456,111 | 6/1984 | Limbacher | 192/91 A X |
| 4,560,051 | 12/1985 | Brandenstein et al. | 192/91 A X |
| 4,561,531 | 12/1985 | Young et al. | 192/91 A X |
| 4,585,106 | 4/1986 | Shirley | 192/91 A X |
| 4,585,107 | 4/1986 | Leigh-Monstevens | 192/91 A X |
| 4,585,108 | 4/1986 | Leigh-Monstevens | 192/91 A X |
| 4,585,109 | 4/1986 | Shirley et al. | 192/91 A X |
| 4,591,039 | 5/1986 | Lutz et al. | 192/91 A |
| 4,606,449 | 8/1986 | Lederman | 192/91 A |
| 4,607,737 | 8/1986 | Hans et al. | 192/91 A X |
| 4,609,087 | 9/1986 | Shirley | 192/85 CA |
| 4,637,505 | 1/1987 | Huber | 192/91 A X |
| 4,660,694 | 4/1987 | Nix et al. | 192/91 A X |
| 4,660,702 | 4/1987 | Flotow | 192/91 A X |
| 4,684,003 | 8/1987 | Leigh-Monstevens | 192/85 CA |
| 4,687,084 | 8/1987 | Leigh-Monstevens et al. | 192/85 CA |
| 4,691,814 | 9/1987 | Wimbush | 192/91 A |
| 4,708,228 | 11/1987 | Leigh-Monstevens | 192/85 CA |
| 4,771,874 | 9/1988 | Leigh-Monstevens | 192/98 |
| 4,821,627 | 4/1989 | Leigh-Monstevens | 192/91 A X |

FOREIGN PATENT DOCUMENTS

| | | | |
|---|---|---|---|
| 847559 | 9/1960 | United Kingdom | 192/91 A |
| 1234402 | 6/1971 | United Kingdom | 192/91 A |

Primary Examiner—Rodney H. Bonck
Attorney, Agent, or Firm—Wigman & Cohen

[57] ABSTRACT

A drive decoupling apparatus for a drive mechanism including a drive shaft, clutch release mechanism, driven mechanism, and diaphragm spring associated with the driven mechanism, premanufactured in a single unit, sub-assembly form such as a cartridge. The design facilitates assembly of the mechanism in a sealed cartridge form in the relatively clean surroundings of a bearing assembly plant, such that the sealed cartridge sub-assembly may be easily installed at an automobile assembly factory at the time of installation of the other drive train components.

19 Claims, 1 Drawing Sheet

CONCENTRIC SLAVE CYLINDER

THE TECHNICAL FIELD

The present invention relates generally to a drive coupling/decoupling apparatus, and more particularly to a clutch release mechanism. The invention more specifically relates to the incorporation of a clutch release system and transaxle shaft support bearing, which may be in the form of a cartridge for assembly on the input shaft of an automotive transmission or transaxle.

BACKGROUND OF THE INVENTION

Various configurations of concentric or annular slave cylinder clutch release systems are known in the prior art. U.S. Pat. Nos. 4,560,051; 4,561,531; and 4,535,106 through 4,585,109 are exemplary of such systems. U.S. Pat. No. 4,591,039 teaches use of an expanding torroidal torque converter instead of an annular clutch, while U.S. Pat. No. 4,606,449, 4,607,737 and 4,637,505 teach use of a membrane backed piston drive. U.S. Pat. No. 4,660,702 discloses misalignment compensation features for use with an annular piston-type slave cylinder. None of the foregoing patents teaches the incorporation of main shaft (or transaxle support) bearings in a unitary assembly such as a cartridge. Also known in the prior art is the incorporation of guide tubes for a clutch release bearing with the input shaft support bearing for a transaxle, such as is used in an automobile.

SUMMARY OF THE INVENTION

The present invention incorporates a combination of a concentric or annular slave cylinder and clutch bearing assembly with the input shaft support bearing for a transaxle contained within a support housing, thus forming a single cartridge unit including the bearing for the input shaft of the transmission, the shaft seal for the bearing, and the clutch release bearing assembly. It is an advantage of the present invention that the concentric slave cylinder clutch release system and the input shaft support bearing for a transaxle are completely integrated in a single assembly. This is made possible by the use of thin section tubular metal cylinder walls.

Advantages of incorporating these components into the input shaft support bearing for an automotive manual transmission include the elimination of certain auxiliary retention devices such as bolts or snap rings and substantially ensuring the proper concentric alignment of the clutch release system with the transmission input shaft.

Another advantage of the present invention is the provision to the automobile manufacturer of a modular subassembly that can be provided affixed to the transmission, thus eliminating the need for sub-assembly at the time the transmission is mated with the engine and drive train.

It is known that the final assembly of close-fitting drive elements needs to be accomplished under particularly clean conditions in order to ensure long life of the assembled drive components. The integrated assembly proposed by the present invention facilitates assembly of the invention under the extra clean conditions prevalent in a bearing assembly environment, whereupon the invention may be installed under more conventional automotive manufacturing conditions with significantly less regard to cleaniness of the immediate work place.

Yet another advantage of the present invention is an integrated design yielding a substantial decrease in the installed cost of the clutch release system for the automobile.

With the above advantages, features, and objects of the invention in view, and others that may become apparent hereinafter, the nature of the invention will become more clearly understood by reference to the attached drawings, the following detailed description thereof, and the appended claimed subject matter.

BRIEF DESCRIPTION OF THE DRAWING

Numerous features of the invention disclosed herein will be apparent upon examination of the drawing FIGURE forming a part hereof.

An exemplary drive coupling/decoupling apparatus according to the present invention is shown in longitudinal section view in FIG. 1.

DETAILED DESCRIPTION OF THE PREFERRED EMBODIMENTS

Figure 1:
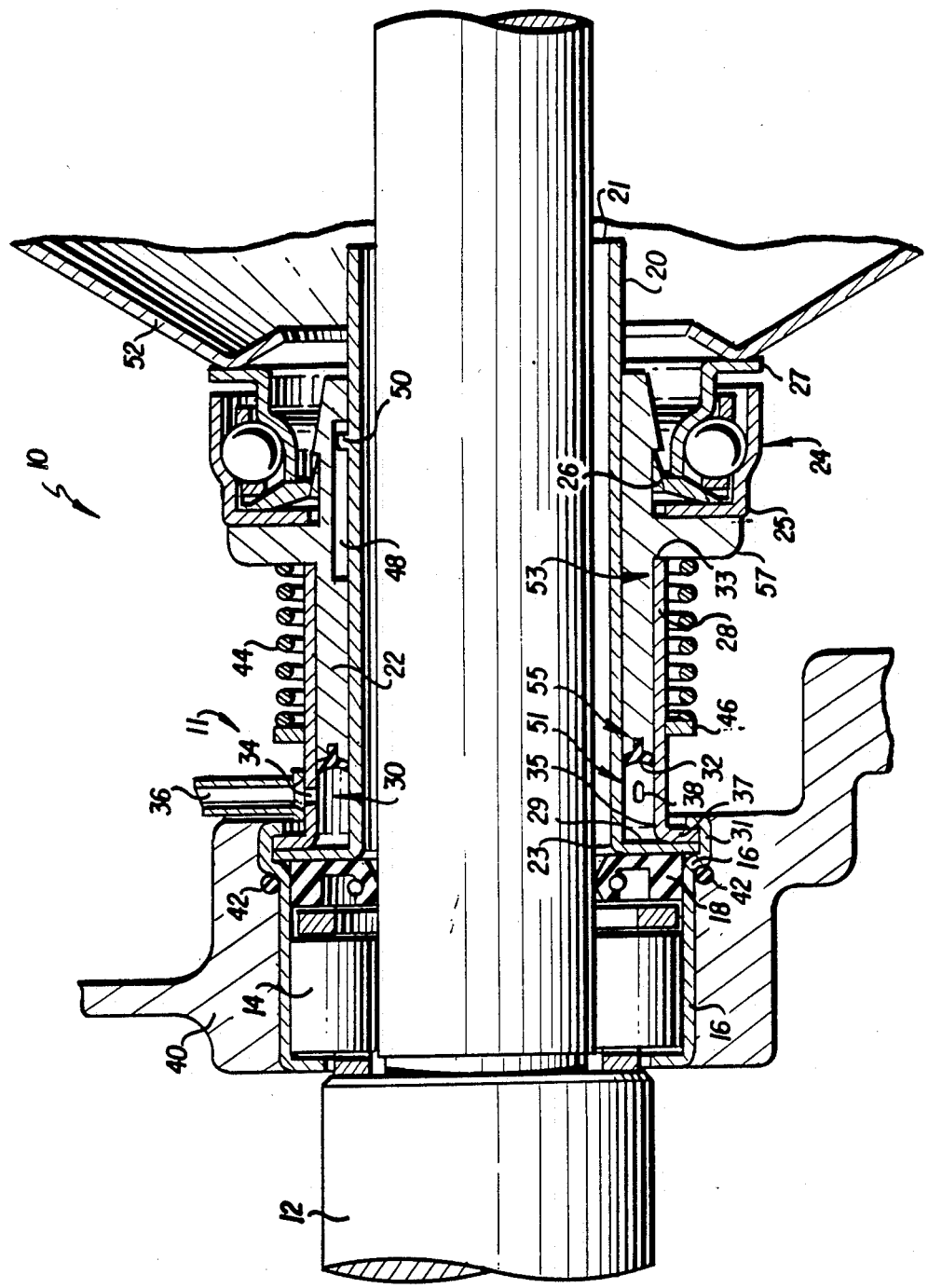

Referring now to the drawing in detail, there is shown in FIG. 1 in longitudinal section view the drive coupling/decoupling apparatus of this invention designated generally by the numeral 10. The coupling/decoupling apparatus 10 includes an input drive shaft 12 supported by roller bearing cage assembly 14 mounted within bearing housing 16. The bearing 14, which is shown as a roller bearing, may be of any suitable bearing configuration capable of supporting the drive shaft radial loads. Input drive shaft 12 is connected to a drive source, not shown.

Bearing housing 16, which may be formed of hardened steel for example, is contained within transaxle main housing 40. Housing 16 may be press-fit or otherwise secured within housing 40. A shaft seal, which may be in the form of a lip seal 18, surrounds shaft 12 within housing 16 to prevent the seepage of oil or fluid thereby. An elongated, cylindrical clutch release first tubular element 20 having a first end 21 and a second end 23 having a radially outwardly extending circumferential lip or annular flange 29, is positioned within an inwardly extending circumferential lip forming an annular groove 31 of bearing housing 16. A second, outer tubular member 28, which is also elongated and cylindrical, and has a first and second ends 33, 35 with a lip or annular flange 37 at the second end 35, is also contained within housing 16. The tubular members 20, 28 shown in FIG. 1 are formed of thin sectional metal, or the equivalent, permitting the lips 29, 37 to be easily formed thereon. The two tubes 20, 28 are of different diameter, coaxially circumjacent the drive shaft 12, and together therebetween form an elongated annular cylinder 30.

The cylinder 30 is divided into two portions 51, 53. First cylinder portion 51 is typically filled with an hydraulic fluid. Piston 22 is slidably received by cylinder 30 second portion 53. The piston 22 for example be made of plastic or other durable material. Piston 22 is substantially elongated and cylindrical in form. The first end 55 of the piston 22 extends into annular cylinder 30. A seal, such as a double lip seal 32, may be utilized to seal the piston 22 within the annular cylinder 30 and against leakage. The second end of the piston 22 includes a portion 57 extending beyond the annular cylinder 30 and in contact with a clutch release bearing 24.

Second tubular member 28 typically includes a first port 34 in fluid communication with the first portion 51 of annular cylinder 30 for connection to a hydraulic fluid pressure source (not shown) via hydraulic fluid line 36. An auxiliary port 38 may be provided with a "bleed nipple" (not shown) for releasably sealing the annular cylinder 30 in order to "bleed" the hydraulic system during installation or maintenance. The previously described steel bearing housing 16 for the support bearing and the first and second guide tubes may be fitted (such as by press fitting or otherwise) and may be sealed (if necessary) within transaxle main housing 40. To ensure a good sealing fit, a seal such as O-ring seal 42 may be inserted between bearing housing 16 and transaxle main housing 40.

Second tubular member 28 may include a protrusion such as spring stop 46, which may be positioned peripherally or at least partially circumferentially around second tube 28, for restraining clutch release preload spring 44, which may be a helical compression type spring.

It is preferred that there be no relative rotational movement between the first (inner) tube 20 and the piston 22; therefore the piston may include longitudinal slot 48 mating with a guide tab 50 radially extending from first (inner) tube 20 in order to permit longitudinal sliding movement of piston 22 via slot 48 on guide tab 50. Equivalent cooperating alignment means are included within the scope of the appended claims. For the purposes of the present example a diaphragm spring 52 may restrain the apparatus 10 from decoupling of a clutch and thus the driven mechanism, not shown. The clutch assembly may also be operated by a flat diaphragm spring or a coil spring, as suited to the specific use.

Clutch release bearing 24 may for the purposes of this example be a ball bearing or other type bearing having a first raceway 25 in contact with piston 22 and a second raceway 27 in contact with, for example, diaphragm spring 52. In the example shown, first raceway 25 is the outer raceway of bearing 24 and second raceway 27 is the inner raceway; the relative raceway configurations may be reversed, as may be desired. A second, small Belleville spring 26 may be included to preload the ball bearings in clutch release bearing assembly 24. Equivalent preload means may be substituted.

In operation, shaft 12 rotates within the assembly. Bearing housing 16 includes and supports the entire cartridge assembly. The clutch slave cylinder comprising tubes 20, 28 forms an annular cylinder 30, filled at first end 51 with hydraulic fluid and at its open end by piston 22. Increasing the pressure applied via hydraulic line 36 via port 34 forces piston 22 outward from cylinder 30 to end 53, thereby depressing clutch spring 52 via release bearing 24, which permits relative rotation between piston 22 and clutch spring 52.

The invention is not to be limited by the illustrative, preferred embodiments disclosed herein. Numerous modifications and variations will be apparent to those skilled in the art. Other equivalent means and methods may be employed without departing from the scope of the present invention as claimed in the appended claims.

I claim:

1. A drive decoupling apparatus for use with an input drive shaft extending into a main housing containing a diaphragm spring operated clutch associated with a driven mechanism, comprising:
   (a) a bearing housing adapted to be carried by said main housing;
   (b) bearing means within said bearing housing for supporting said input drive shaft;
   (c) a clutch slave cylinder including means circumjacent said drive shaft for defining an annular cylinder and an annular piston slidably received in said annular cylinder;
   (d) hydraulic pressure means for axially pushing said annular piston to decouple said clutch; and
   (e) a release bearing assembly interposed between said annular piston and said diaphragm spring, said release bearing assembly being adapted to facilitate relatively unrestricted rotation between said piston and said diaphragm spring;
   wherein said bearing housing further includes means for attaching said clutch slave cylinder thereto independently of said main housing to form a unitized cartridge-like assembly.

2. A drive decoupling apparatus according to claim 1, wherein said annular cylinder defining means further comprise first and second concentric, generally tubular members.

3. A drive decoupling apparatus according to claim 2, wherein each tubular member has first and second ends, and said ends include radial flanges.

4. A drive decoupling apparatus according to claim 3, wherein said attaching means includes an annular groove formed in said bearing housing and wherein said radial flanges are secured within said annular groove.

5. A drive decoupling apparatus according to claim 2, wherein said first and second tubular members are formed of thin section metal.

6. A drive decoupling apparatus according to claim 2, wherein said tubular members include first and second ends, and said second ends include overlapping radial flanges.

7. A drive decoupling apparatus according to claim 2, wherein said tubular members include first and second ends, and said second ends include overlapping radial flanges which are mutually joined to form an annular cylinder sealed at one end.

8. A drive decoupling apparatus according to claim 1, wherein said release bearing assembly is a ball bearing assembly.

9. A drive decoupling apparatus according to claim 1, wherein said release bearing assembly is a roller bearing assembly.

10. A drive decoupling apparatus according to claim 1, wherein said bearing housing is shaped to be press-fit into said main housing.

11. A drive decoupling apparatus according to claim 1, further including means for restricting relative rotation between said annular cylinder and said annular piston which means for restricting relative rotation permits at least a limited range of substantially free axial movement of the piston relative said annular cylinder.

12. A drive decoupling apparatus according to claim 1, further including means circumjacent said drive shaft within said bearing housing for inhibiting fluid leakage.

13. A drive decoupling apparatus according to claim 12, wherein said seal is a lip seal.

14. A drive decoupling apparatus for use with an input drive shaft extending into a main housing containing a diaphragm spring operated clutch associated with a driven mechanism, comprising:
   (a) a bearing housing adapted to be carried by said main housing;
   (b) bearing means within said bearing housing for supporting said input drive shaft;
   (c) a clutch slave cylinder including means circumjacent said drive shaft for defining an annular cylinder and an annular piston slidably received in said annular cylinder, said annular cylinder defining means further comprising first and second concentric, generally tubular members;

(d) hydraulic pressure means for axially pushing said annular piston in the direction of said diaphragm spring to decouple said clutch; and (e) a release bearing assembly interposed between said annular piston and said diaphragm spring, said release bearing assembly being adapted to facilitate relatively unrestricted rotation between said piston and said diaphragm spring;

wherein said bearing housing further includes means for attaching said clutch slave cylinder thereto.

15. A drive decoupling apparatus according to claim 14, wherein said first and second tubular members are formed of thin section metal.

16. A drive decoupling apparatus according to claim 14, wherein said tubular members include first and second ends, and said second ends include overlapping radial flanges which are mutually joined to form an annular cylinder sealed at one end.

17. A drive decoupling apparatus according to claim 14, further including means for restricting relative rotation between said annular cylinder and said annular piston while permitting relatively unrestricted axial movement of the piston relative said annular cylinder.

18. A drive decoupling apparatus according to claim 14, further including means circumjacent said drive shaft within said bearing housing for inhibiting fluid leakage.

19. A drive decoupling apparatus according to claim 14, wherein said attaching means include overlapping radial flanges formed on said tubular members.

* * * * *